United States Patent [19]

Drexler et al.

[11] Patent Number: 4,957,580
[45] Date of Patent: Sep. 18, 1990

[54] METHOD FOR MAKING AN OPTICAL DATA CARD

[75] Inventors: Jerome Drexler; Joseph B. Arnold, both of Los Altos Hills, Calif.

[73] Assignee: Drexler Technology Corp., Calif.

[21] Appl. No.: 252,829

[22] Filed: Oct. 3, 1988

Related U.S. Application Data

[62] Division of Ser. No. 855,228, Apr. 23, 1986.

[51] Int. Cl.⁵ .................. B32B 31/18; G06K 19/00
[52] U.S. Cl. ................................ 156/250; 156/267;
156/277; 235/454; 235/456; 235/462; 235/488;
235/494; 346/135.1
[58] Field of Search ............... 156/267, 250, 277;
235/487, 488, 494, 454, 456, 462; 346/135.1

[56] References Cited

U.S. PATENT DOCUMENTS

| | | | |
|---|---|---|---|
| 3,676,644 | 7/1972 | Vaccaro et al. | 235/488 |
| 3,795,794 | 3/1974 | Figuls | 235/488 |
| 3,838,252 | 9/1974 | Hynes et al. | 235/488 |
| 3,845,279 | 10/1974 | Rosdorff | 235/61 |
| 3,949,501 | 4/1976 | Andrews et al. | 235/488 |
| 4,094,013 | 6/1978 | Hill et al. | 365/234 |
| 4,195,773 | 4/1980 | Ogden | 235/495 |
| 4,199,783 | 4/1980 | Huignard et al. | 358/132 |
| 4,213,041 | 7/1980 | Smith | 235/488 |
| 4,252,889 | 2/1981 | Tinet et al. | 430/290 |
| 4,304,848 | 12/1981 | Bouldin et al. | 430/401 |
| 4,430,563 | 2/1984 | Harrington | 235/494 |
| 4,524,925 | 6/1985 | Haddock | 242/197 |
| 4,542,288 | 9/1985 | Drexler | 235/487 |
| 4,588,882 | 5/1986 | Buxton | 235/487 |
| 4,598,196 | 7/1986 | Pierce et al. | 235/454 |
| 4,634,850 | 1/1987 | Pierce et al. | 235/487 |
| 4,680,459 | 7/1987 | Drexler | 235/487 |
| 4,703,469 | 10/1987 | Pettigrew et al. | 369/101 |
| 4,753,864 | 6/1988 | Bouldin et al. | 346/135.1 |
| 4,788,129 | 11/1988 | Bouldin et al. | 346/135.1 |

*Primary Examiner*—Caleb Weston

[57] ABSTRACT

A method for making optical data cards wherein a preformatted recording tape having a continuous pattern of servo tracks is adhered to a web of data card base material. The data cards are then cut such that the ends of the tape coincide with ends of the card. Beginning and end marks to the servo tracks are laser written in situ on the card. A transparent protective layer may be applied over the recording strip. The continuous servo tracks may extend in a lengthwise direction to the strip as well as in a direction transverse to the lengthwise direction or may extend in both directions forming a grid pattern.

16 Claims, 3 Drawing Sheets

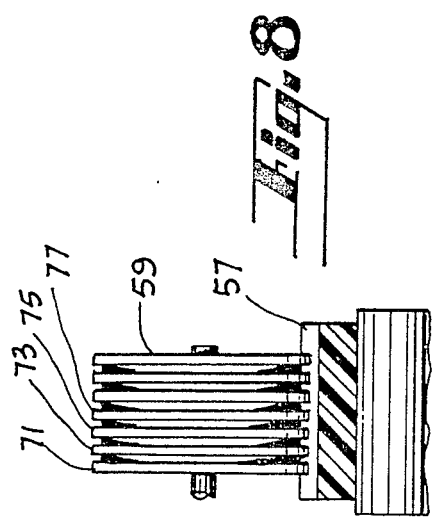
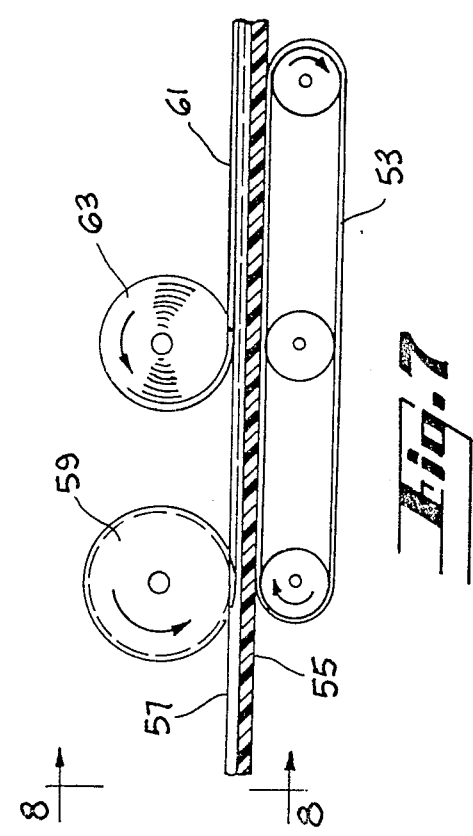
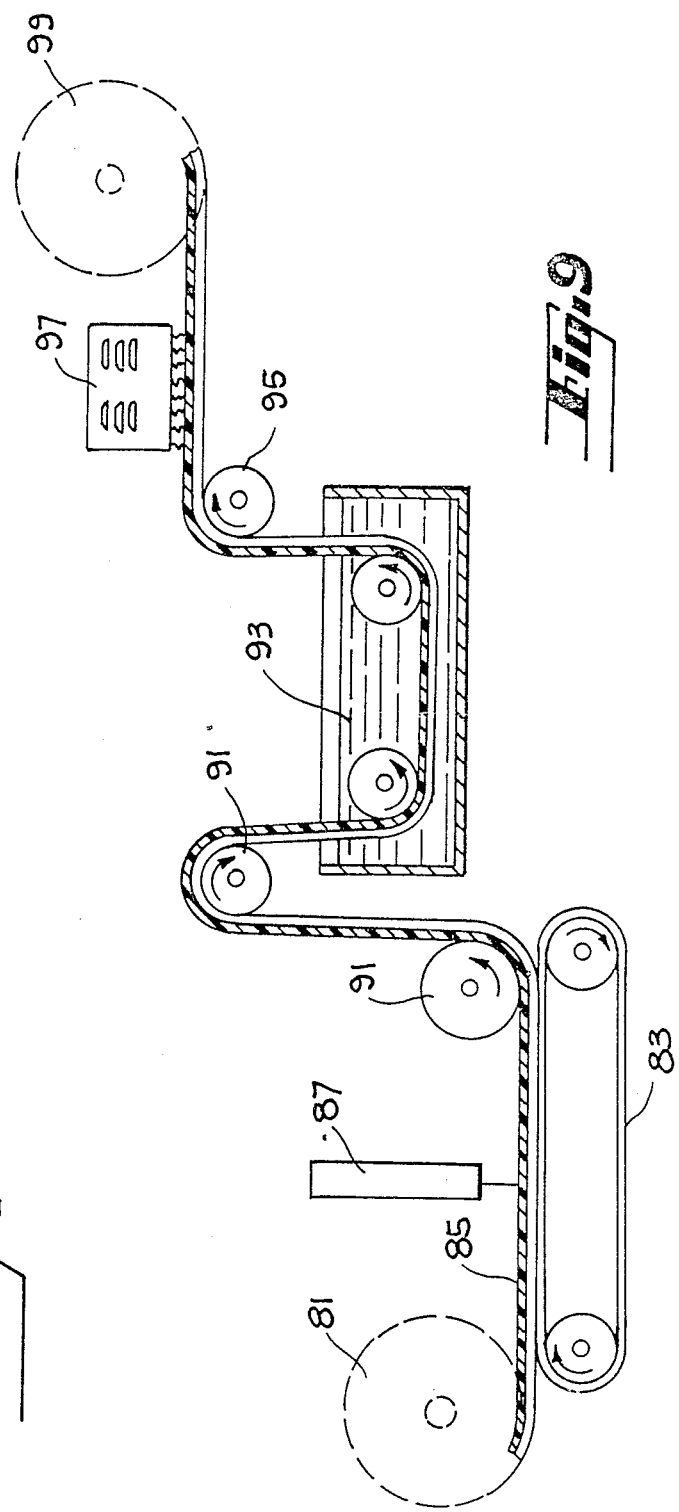

METHOD FOR MAKING AN OPTICAL DATA CARD

CROSS REFERENCE TO RELATED APPLICATION

This application is a division of application Ser. Number 855,228, filed Apr. 23, 1986.

1. Technical Field

The invention relates to a method for making laser recorded and read data cards.

2. Background Art

In U.S. Pat. No. 4,542,288 Drexler discloses a data card having photolithographically prerecorded information thereon, such as servo tracks. The servo tracks are made up of positioning marks which may be used to generate a position error signal for a feedback control system. The marks are recorded in a preinscribed pattern and are periodic, meaning that the marks are spaced apart from one another.

In U.S. Pat. No. 4,588,882 Buxton discloses a data card having prerecorded geometric marks for aiding servo tracking. The geometric marks are spaced apart in a band or track parallel to a data track. As a detector scans across two identical marks, skew is detected relative to the data track. Based on a ratio of areas between the two marks a closed-loop servo system resolves the skew and positions the detector for reading the data track.

In U.S. Pat. No. 4,304,848 Bouldin and Drexler disclose replication of prerecorded information for optical data storage media. Latent images of the information are formed in the media by exposing the media to actinic radiation through a mask. The final result is media which contain prerecorded information and which can record further information.

Other cards with prerecorded tracks and marks are known. In most instances, these tracks and marks occur in periodic patterns. The tracks and marks are aligned with printing on the card such that registration is achieved between the data strip and the printing. The tape is aligned with printing on the card and then is adhered to the card base. Uncontrolled stretching between the tape and the card base sometimes makes it difficult to achieve registration between the tape and the printing. A significant amount of effort is expended in achieving registration.

An object of the invention was to devise a method for forming data cards which would simplify the manufacture of such cards.

SUMMARY OF THE INVENTION

The above object has been achieved with a method for forming data cards from rolls of preformatted optical recording tape. The tape is an optical storage medium on which a continuous pattern of parallel, spaced apart, servo tracks are prerecorded. The servo tracks run the entire length of the tape. The tracks may either extend in the lengthwise direction of the tape or transverse to the lengthwise direction. The only requirement is that the pattern be continuous along the entire length of the tape. Tape lengths longer than the distance between ends of the card are joined to card base material to form cards.

The tape is a self-supporting optical recording medium having a transparent, protective cover layer. The medium may also have a backing layer which may serve to facilitate bonding to a card base.

The process of manufacturing the data cards is made simpler because no registration is required between the preformatted tape and the card base. This means that uncontrolled stretching of tape and the card base is no longer a great concern.

BRIEF DESCRIPTION OF THE DRAWINGS

FIG. 7 is a side plan view of an apparatus for disposing servo tracks on an optical recording tape in accord with the present invention, by means of embossing.

FIG. 8 is a front view of the embossing apparatus of FIG. 7 taken along lines 8—8 therein.

FIG. 9 is a side plan view of an apparatus for disposing servo tracks photolithograghically.

BEST MODE FOR CARRYING OUT THE INVENTION

Figure 1:
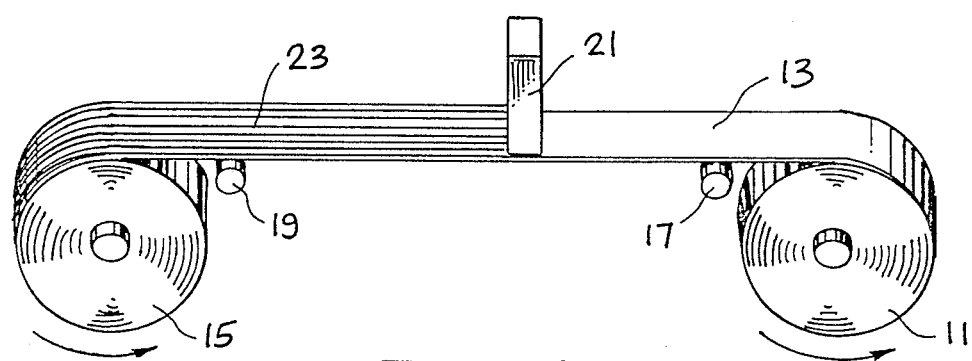
FIGS. 1 and 1a are plan views of an optical recording tape with continuous tracks in accord with the present invention.
Figure 1A:
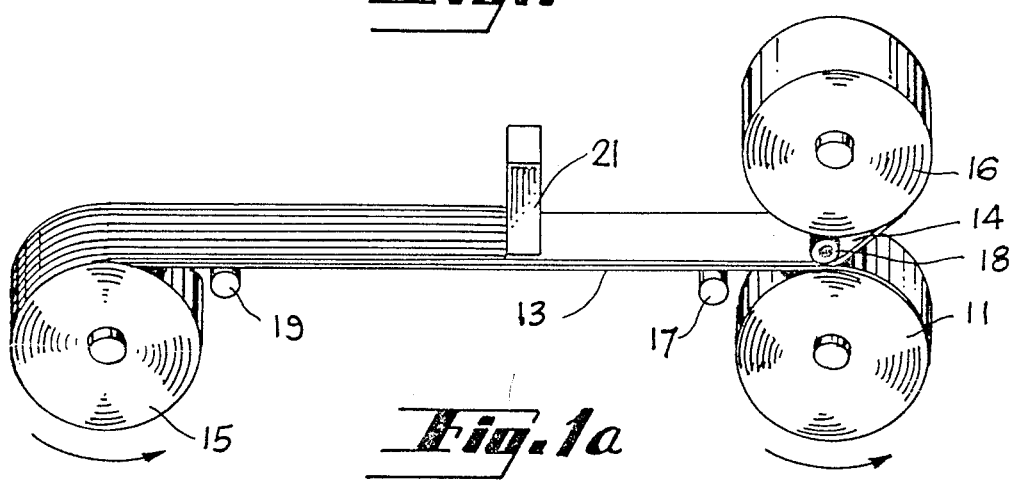

With reference to FIGS. 1 and 1a, a supply tape hub 11 is seen dispensing a tape web 13 to a tape take-up hub 15, the tape passing around turning or support posts 17 and 19. The tape is an optical recording medium capable of recording laser writing. A linear array 21 of semiconductor diode lasers makes parallel, spaced-apart servo tracks 23 on the tape by etching, eroding, melting or ablating material from the tape. The servo tracks are continuous along the length of the tape and run in the lengthwise direction.

The purpose of the servo tracks is to guide a laser beam writing data on the tape or on a segment of the tape which is cut from the tape. Such writing will usually occur at a later time after formatting with servo tracks has been completed. Such a system guides a laser beam so that data is written or read in a path which is related to the servo tracks, such as the space between adjacent tracks. It is important that parallelism be accurately maintained and so a mechanical alignment mechanism, not shown, may be used to insure that the dimension of the tape passing in front of laser bar 21 is proper. Moreover, all portions of the tape should experience uniform lateral tension so that the tape is not squeezed together between opposite edges. In FIG. 1 laser writing is applied directly to the tape, while in FIG. 1a, a transparent web 14 is dispensed from pack 16 and laminated through pressure roller 18 onto tape web 13 so that a two-layer recording material is formed. The transparent web may be a thin Polycarbonate layer which adds scratch resistance and moisture protection to the recording layer. The width of the transparent layer may correspond to the width of the recording tape or may be wider than it. Laser recording of servo tracks by array 21 is done through the transparent layer.

The tape has a width ranging from about 1 cm. to 5.5 cm., the approximate width of a wallet-size card to which segments of the tape may be applied. The tape is relatively thin, about 500 microns or less, although this is not critical. A preferred tape material comprises a film base having an emulsion coating of the type described in U.S. Pat. Nos. 4,284,716; 4,298,684; 4,278,758; 4,278,756 and 4,269,917, all assigned to the assignee of the present invention, and all incorporated by reference herein. The recording material which is selected should be compatible with the laser used for writing on it. Some materials are more sensitive than others at certain wavelengths. Good recording sensitivity to near-infrared light is preferred because semireadily conductor lasers creasting the required light beams are readily available. The selected recording material should have a favorable signal-to-noise ratio and form high contrast databits with read/write systems with which it is used. The material should not lose data when subjected to temperatures of about 140° F. (60° C.) for long periods. The material should also be capable of recording at speeds of at least several thousand bits per second. This generally precludes the use of materials that require long heating times or that rely on slow chemical reactions in the presence of heat, which may permit recording of only a few bits per second.

Data is recorded by forming spots in relation to the servo track lines in the surrounding field of the reflective layer, thereby altering the reflectivity of the data spot. The data spot may be black in the reflective field; clear with respect to an opaque field, shiny with respect to a dark field or have light scattering properties with respect to the surrounding field such as formed by a pit or other depression. Data is read by detecting optical contrast between the data spots and the surrounding field of unrecorded areas. A preferred recording material described in the above-identified patents is known as Drexon, a trademark of Drexler Technology Corporation. This is a silver and gelatin composite produced from a photosensitive medium which may be exposed to light in selected areas for photolithographic prerecording and then the medium processed to form a laser recording material. The processing consists of partial chemical development of the exposed latent image to create a visible servo track pattern, and then a silver diffusion transfer process to convert undeveloped silver into shiny reflective silver. This process is described in U.S. Pat. No. 4,284,716. In FIG. 1, servo track patterns are recorded after the optical recording medium is formed using direct-read-after-write media. This is in contrast to media described below wherein track patterns are recorded as latent images before the optical medium is formed.

The tape path illustrated in FIG. 1 is a very simple path with drive power being applied directly to one of the hubs by a transport mechanism. The tape may be reversed in direction of travel by applying power to the opposite hub. Hubs may be driven directly by motors or by belts attached to pulleys in power communication relation to the hubs. Sometimes more complicated systems of posts and tape paths are used for high-speed tape transport. A read head could be combined with the laser bar writing mechanism 21 to form a read/write system. The read head would consist of a number of photo diodes or CCD elements in a linear array, spaced similarly as the laser bar 21, except being vertically movable, as by a servo controlled piezoelectric element in order to maintain the read elements in a data path following position.

While lengthwise servo tracks are shown, together with data paths which are similarly along the length of the tape, it is also possible to have side-to-side servo tracks, transverse to the longitudinal extent of the tape. Such tracks are known as lateral tracks, to distinguish them from the lengthwise tracks previously described. Lateral tracks consist of parallel, closely spaced tracks with a line-to-line separation, approximately the same as for longitudinal tracks. The spacing must be sufficient to accommodate a data path between adjacent tracks or in some relation to a track, such as overlying it, with enough room for adjacent paths.

Lateral tracks would be written by a scanning laser which sweeps across the width of the tape as the tape is advanced past a scanning station. Data is similarly written and read. In the read situation, servo tracks could be detected by a linear array of detector elements, such as a CCD array. A servo track would be detected when a continuous line is observed by the array. Other nearby markings on the tape would be data spots, followed by another servo track. The linear array would be aligned parallel to the servo tracks with tape motion synchronized with detector electronics, allowing the detector array a sufficient time to observe a pattern on the tape as the tape advances past the detector array. The tape need not stop for observation, but may move continuously past the detector array.

Figure 2:
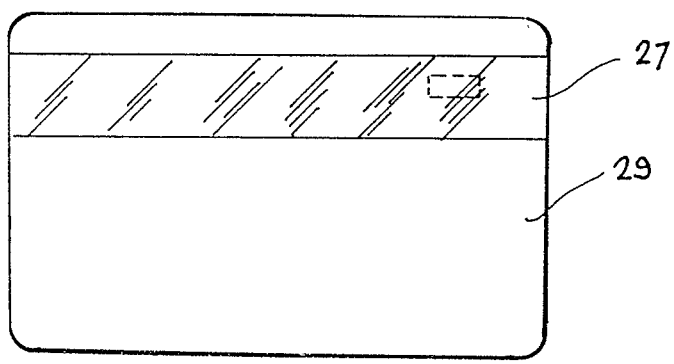
FIG. 2 is a top plan view of a data card bearing a strip of optical recording tape of the present invention.

Essentially the same thing happens when strips of the optical recording material are applied to data cards. FIG. 2 shows the data card 25 being a wallet-size card, containing a strip 27 of laser recordable optical data storage and recording media, such as that previously described with respect to FIG. 1, except in strip form. Strip 27 may be a composite formed of plural layers as described below. The card could meet the ISO dimensions for plastic credit cards and the strip has a capacity of at least 250,000 bits. Servo tracks are present, but not shown because the fine nature of the track line generally makes them invisible, except with magnification.

In the portion 29 of the card, not occupied by strip 27, there is printing on the same side as the strip, and sometimes on the back side of the card base. In the prior art it is required that the strip 27 containing a servo track format with a well-defined beginning and end be placed in registration with the portion 29 during manufacture. Now, however, since servo tracks are continuous, the strip need not be registered with the printing during manufacture but need only span the lengthwise dimension of the card. This means that a strip much longer than a card length is adhered to a card base from which many cards can be cut out Typically the strip and card base are 1000 feet long and capable of producing several thousand wallet-size cards. The continuous servo tracks are one of the principal features of the present invention. The use of continuously preformatted optical recording media on data cards is seen to provide a huge advantage in simplifying the manufacture of such cards since no registration is required between the preformatted tape and the printed card base. In the prior art uncontrolled stretching of the 1000-foot-long tape and the 1000-foot-long card base, owing to changes in temperature and tension, makes registration of the card printing to the tape with card-length formatting difficult. In the present invention laser-writing on the finished card in a read-write machine is used to write the well-defined beginning and end of the servo tracks using the card edges or card printing as a reference.

Figure 3:
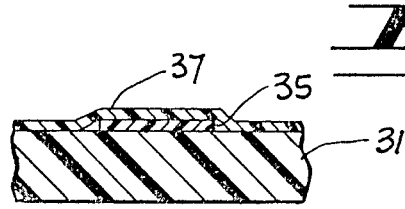
FIG. 3 is a side view of a first embodiment of the card of FIG. 2.

In the side view of FIG. 3, card base 31 may be seen to have the strip 35 mounted on the base. The thickness of the strip is greatly exaggerated in order to show the two-layer construction of FIG. 3. Normally, the strip would be nearly flat with the card surface. The tape consists of a recording layer 35 of the type previously described and a protective layer 37 which is a thin, transparent plastic laminating strip or a coating, such as a transparent lacquer. The material is preferably made of polycarbonate plastic. The strip 35 is adhered to base 31 by means of a bonding layer which binds the strip to the polycarbonate, without trapping air bubbles. Such bonding layers are well known and are presently used in adhering various types of recording layers to bases. The exact type of bonding layer depends upon the material selected and should have good compatibility with both selected materials.

Figure 4:
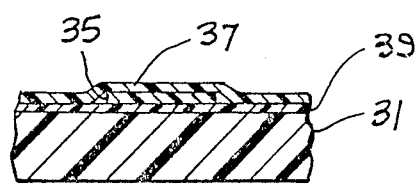
FIG. 4 is a side view of a second embodiment of the card of FIG. 2.

FIG. 4 shows an alternate construction of a card where, instead of a thin bonding layer, a moisture barrier layer 39 is used between recording layer 35 and base 31. The barrier layer may be a moisture barrier, as well as a bonding material, adhering the under side of the recording layer 35 to the card base. Once again, a protective layer 37 is disposed over the recording layer. Both the protective layer 37 and the carrier layer 39 have approximately the same width, sandwiching the recording layer 35 between these two layers. A good moisture barrier material is Aclar, a trademark of Allied Chemical.

With respect to both FIGS. 3 and 4, the composite recording strip, made of at least two layers, is formed as an intermediate material prior to being adhered to the card base. The composite strip is made in tape form, wound on a reel or similar structure and then bonded to a continuous card base web and finally cut to the exact card size. The preformatted servo tracks on each recording strip extend from one end of the card to the other. After the card is cut to size, special marks may be applied to the strip by laser recording or otherwise in order to mark the recording areas for a card reading apparatus. Special lines or other marks such as track numbers and clocking information may be placed to designate the beginning and end of the servo tracks to facilitate follow-on laser recording and reading of the data.

Figure 5A:
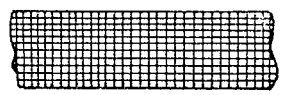
FIG. 5a is a top view of a portion of a strip of optical recording tape in accord with the present invention, showing prerecorded servo tracks disposed in the lengthwise and transverse directions of the tape.
Figure 5:
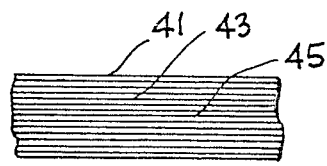
FIG. 5 is a top view of a portion of a strip of optical recording tape in accord with the present invention, showing prerecorded servo tracks disposed in the lengthwise direction of the tape.
Figure 6:
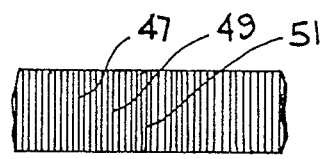
FIG. 6 is a top view of a portion of a strip of optical recording tape in accord with the present invention, showing prerecorded servo tracks disposed in a direction transverse to the lengthwise direction of the tape.

FIGS. 5, 5a and 6 show servo tracks extending the length of a cut strip. In FIG. 5, the tracks 41, 43 and 45 extend longitudinally parallel to the lengthwise direction of the strip. The tracks are spaced apart at least wide enough to accommodate data spots between the tracks, although several writing areas could be associated with one track. As an example the tracks may be 10 microns apart, with data spots having a size of five microns between the tracks and a servo track line width of three microns. In FIG. 6, the tracks are again parallel, but transverse to the lengthwise direction of the tape. In FIG. 6, the tracks 47, 49, 51 and so on, are perpendicular to the lengthwise direction of the tape. In FIG. 5a, the tracks run in two perpendicular directions.

In this case, a read system could follow either set of tracks or treat the tracks as forming a grid in which data is written in relation to the grid, either on the lines or tracks, or inside of the rectangles formed by the tracks. Data could be located by counting line crossings from marked reference positions. The grid pattern could also be used as a reference guide when strips of the tape are used for recording of data by means of photolithography. The grid pattern forms can be used for alignment of data spots.

Servo tracks may be applied mechanically, as by embossing, photolithographically or lithographically. In FIG. 7, a web advancing mechanism 53 is in contact with the back side of continuous tape 55. The tape has a surface region 57 which is embossed by a wheel assembly 59 having closely spaced parallel wheel members. As tape advances, a protective layer 61 is applied over the tape from the layer pack 63. With mechanical embossing, it is not possible to provide a large number of closely spaced preformatted tracks. Nevertheless, depending upon the required information density, a lesser number of tracks may be provided which is adequate for the intended purpose. FIG. 8 shows a plurality of wheel members 71, 73, 75, 77 and so on which make up the wheel assembly 59 for embossing upper surface 57 with parallel tracks or grooves which may be read by a beam because of the scattering created by the grooves. Data may either be written in the depressions formed by the wheels, or the spaces therebetween. In any event, focus for the reading beam is adjusted to the plane in which the data lies. Even though focus is in one plane, transitions between data paths is noted by changes in scattering patterns as the beam crosses the preformatted tracks. Reflective contrast between tracks and the recording field should be at least 1.2 to one.

FIG. 9 illustrates photographic application of tracks to a photosensitive medium. While FIG. 1 shows direct read-after-write laser recording of tracks, FIG. 9 shows recording of tracks as a latent image and then photographic processing and development. In other words, the servo track pattern is made before the laser recording medium is fully formed. The method described with reference to FIG. 9 is preferred for higher data densities to the method described with reference to FIG. 7. Tape 85 is driven by a tape advancing mechanism 83 from a spool 81 beneath a laser bar or other light source bar 87. The laser bar or other light source bar creates a latent image of parallel, spaced-apart tracks running in the lengthwise direction of the tape. The entire mechanism illustrated in FIG. 9 is shielded in a protective housing which preserves the light sensitive character of the photosensitive medium. Turning idlers 91 advance the tape into a processing solution 93 where the latent image is converted to a negative or positive image. Additional tanks, not shown, are used for the conversion process, described more fully in U.S. Pat. No. 4,278,756. The tape is advanced past idler 95 and beneath a drying unit 97 after several process steps convert it to Drexon recording material, as explained below, and then wound on a takeup hub 99. This prerecorded tape is then stored for future use. See also the description of prerecording techniques described in the above-mentioned U.S. Pat. No. 4,304,848, incorporated by reference herein, which could be used for strips of tape.

In more detail, Drexon recording medium can be made as follows. The surface of a fine grained silver-halide emulsion photosensitive web is exposed briefly to a low level of actinic radiation over the entirety of the web and a moderate level exposure of the desired servo track pattern forms a prerecorded latent image. This exposed silver halide is then developed to an optical density typically 0.05 to 2.0, as measured with red light of a photographic densitometer. This gelatin layer containing filamentary silver particles exhibits an optical density of typically 0.05 to 0.8 for a 3 micron emulsion and 0.1 to 1.5 for a 6 micron emulsion. After this initial processing step, the emulsion layer is gray in appearance, but a large amount of the silver halide in the emulsion remains unaltered. A very thin layer of unexposed silver halide at the surface of this partially developed emulsion layer is then chemically fogged to form a very dense layer of silver precipitating nuclei at that surface. The fogged medium is finally subjected to a negative silver diffusion transfer step wherein the silver halide in the emulsion is solvated to form soluble silver complexes. These silver complexes are precipitated on the silver precipitating nuclei to form a reflective layer comprising non-filamentary silver particles which aggregate with the filamentary silver. The degree of reflectivity of the surface may be adjusted over a range of values depending upon the ratios of the two types of silver. This same mechanism also causes some of the silver ion complex to precipitate on the filamentary silver in the absorptive underlayer, increasing the optical density to red light of this already developed underlayer typically by at least a factor of two increase in light absorption.

The final result of these two exposure/development sequences is a superior reflective laser recording medium which is comprised of a very thin layer of reflective but non-electrically conducting reduced non-filamentary silver and a much smaller amount of filamentary silver, under which lies a highly absorptive layer consisting primarily of filamentary silver in a gelatin matrix. The exposed and developed servo track pattern is lower reflectivity pattern created by the filamentary silver. The absorptive underlayer typically has a final optical density to red light of between 0.2 and 3.0. The original silver-halide emulsion photosensitive medium which eventually results in the above described reflective laser recording medium is usually coated on a polymer substrate. The reflective surface has a reflectivity to green light of 44% for a typical sample. Silver-halide emulsions also form a surface relief pattern after the development step which also can be used for servo tracking.

Laser recording on this medium can be made very efficient. The absorptive filamentary silver particles in the reflective layer can be increased until the maximum acceptable reflectivity is reached. These filamentary particles are absorptive over a very wide spectrum range from ultraviolet to near infrared, permitting a wide variety of lasers to be used for recording. Also, the light energy that is not absorbed by the reflective layer is almost entirely absorbed by the underlayer which causes a rise of temperature at the interface of the reflective layer and underlayer, thereby facilitating the melting of the reflective layer. Recording is accomplished by use of a laser beam to pit the gelatin at a spot in the reflective layer, thereby reducing the reflectivity at the spot. Before recording, the reflectivity of the reflective layer is specular; in other words incident light perpendicular to the surface will be reflected back towards its origin in a parallel line. After recording, perpendicular incident light will be diffusely reflected because the light returning towards origin will be scattered as opposed to parallel. This latter effect and the increased absorptivity at the spot lead to a lowered reflectivity. The absorptive underlayer would be only slightly penetrated by the recording process. None of the silver in either layer is melted during the recording process.

While FIG. 9 illustrates creation of a latent image on a photosensitive emulsion and then development, a similar structure could be created by printing or engraving directly upon the tape. Usually, lines created by such processes will not have the narrow width of optically produced lines, but may adequately serve the intended purpose if information storage densities are not particularly high. For high storage density, laser created lines are preferred. After the tape is stored on the storage hub 99 it may be used in the manufacture of data cards or labels. It may be used in reel form or cut into strips before use. Once mounted on data cards, the cards may be written and read with an apparatus similar to the one shown in FIG. 10.

Figure 10:
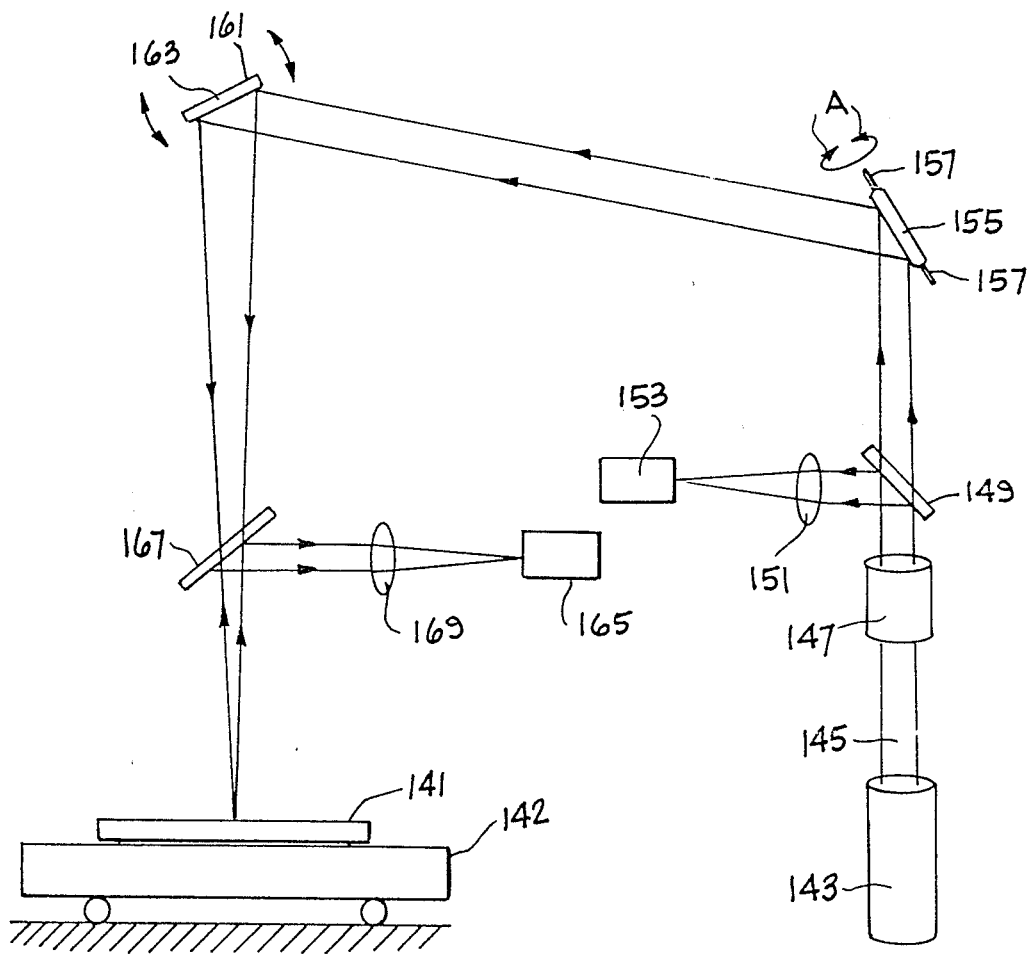
FIG. 10 is a plan view of an apparatus for reading and writing on a strip of tape having prerecorded tracks in accord with the present invention.

In FIG. 10, a side view of the lengthwise dimension of a card 141 is shown. The card is usually received in a movable holder 142 which brings the card into trajectory of a laser beam described below. A laser light source 143, preferably a pulsed semiconductor laser of near infrared wavelength emits a beam 145 which passes through collimating and focusing optics 147. The beam is sampled by a beam splitter 149 which transmits a portion of the beam through a focusing lens 151 to a photodetector 153. The detector 153 confirms laser writing and is not essential. The beam is then directed to a first servo controlled mirror 155 which is mounted for rotation along the axis 157 in the direction indicated by the arrows A. The purpose of the mirror 155 is to find the lateral edges of the laser recording material in a coarse mode of operation and then in a fine mode of operation identify data paths which exist predetermined distances from the edges.

From mirror 155, the beam is directed toward mirror 161. This mirror is mounted for rotation at pivot 163. The purpose of mirror 155 is for fine control of motion of the beam along the length of the card. Coarse control of the lengthwise position of the card relative to the beam is achieved by motion of movable holder 142. The position of the holder may be established by a linear motor adjusted by a closed loop position servo system of the type used in magnetic disk drives. The card has a preinscribed pattern containing servo tracks, as previously described above. These positioning marks are used as a reference for the laser recording system to record or read data at particular locations.

Upon reading one data path, the mirror 155 is slightly rotated. The motor moves holder 142 lengthwise so that the path can be read, and so on. Light scattered and reflected from the spots contrasts with the surrounding field where no spots exist. The beam should deliver sufficient laser pulse energy to the surface of the recording material to create spots. Typically, 5-20 milliwatts is required, depending on the recording material. A 20 milliwatt semiconductor laser, focused to a five micron beam size, records at temperatures of about 200° C. and is capable of creating spots in less than 25 microseconds. The wavelength of the laser should be compatible with the recording material. In the read mode, power is lowered to about 5% of the record power.

Optical contrast between a spot and surrounding field is detected by light detector 165 which may be a photo-diode. Light is focused onto detector 165 by beam splitter 167 and focusing lens 169. Servo motors, not shown, control the positions of the mirrors and drive the mirrors in accord with instructions received from control circuits, as well as from feedback devices. The detector 165 produces electrical signals corresponding to spots. These signals are processed and recorded for subsequent display as useful information regarding the transaction recorded on the card. The card may be used to record various types of data, as medical records, insurance records, personal information, or financial transactions and it may also be used for publishing information.

I claim:

1. A method of making a wallet size data card comprising the steps of, preformatting a roll of optical recording tape with a continuous pattern of straight solid parallel lines defining a set of parallel, spaced apart, prerecorded servo tracks, adhering strips of said tape to card base material so that ends of said strip extend beyond opposite ends of the length of a data card, and cutting said strip such that ends of the strip coincide with ends of the card.

2. The method of claim 1 further comprising the step of providing a transparent protective cover layer over said recording tape.

3. The method of claim 1 wherein said recording tape includes a backing layer under said tape.

4. The method of claim 1 wherein said continuous pattern of servo tracks extend in a lengthwise direction of the strip.

5. The method of claim 1 wherein said continuous pattern of servo tracks extend in a transverse direction to the lengthwise direction of the strip.

6. The method of claim 1 wherein said continuous pattern of servo tracks extend in a lengthwise direction as well as in a direction transverse to the lengthwise direction, forming a grid-pattern.

7. The method of claim 1 further defined by laser recording markings in situ on said card, after said strip is adhered to said card base.

8. The method of claim 1 wherein said preformatting of continuous pattern of servo tracks is accomplished by one of laser writing, photolithography, and embossing.

9. A method for making a plurality of wallet size data cards from a preformatted roll of optical recording tape and a preprinted web of card base material, the method comprising the steps of, partially preformatting a length of optical recording tape with a continuous pattern of straight solid parallel lines defining a set of parallel, spaced apart, prerecorded servo tracks that extend substantially the entire length of the tape, providing a transparent protective cover layer over the recording tape, adhering said tape to a length of card base material webbing such that the lengthwise edges of the tape are aligned parallel to the lengthwise edges of the base material webbing, said card base material webbing having a width equal to a multiple of the width of a wallet size card and having preprinted indicia thereon, said tape having a length substantially equal to the length of said base webbing, and cutting a plurality of cards from said base webbing such that ends of said tape coincide with ends of said cards with the continuous pattern of servo tracks extending the entire length of each card.

10. The method of claim 9 wherein said preformatting of continuous pattern of servo tracks is accomplished by at least one of laser writing, photolithography and embossing.

11. The method of claim 1 further comprising the step of formatting said card in situ by laser writing non-continuous marks on said strip, the formatting marks located relative to indicia on said card and edge of said card.

12. The method of claim 9 wherein said tape includes a backing layer under said tape.

13. The method of claim 9 wherein said preformatting of said tape is further defined by prerecording said continuous pattern of servo tracks in a lengthwise direction of said tape.

14. The method of claim 9 wherein said preformatting of said tape is further defined by prerecording said continuous pattern of servo tracks in a direction transverse to the lengthwise direction of said tape.

15. The method of claim 9 wherein said preformatting of said tape is further defined by prerecording said continuous pattern of servo tracks in a lengthwise direction as well as in a direction transverse to the lengthwise direction forming a grid pattern.

16. The method of claim 9 further including the step of completing said formatting by laser writing non-continuous marks in situ on said cards after said cards have been cut, location for writing said marks being determined with reference to one of indicia on said cards and edges of said cards.

* * * * *